United States Patent
Kim et al.

(10) Patent No.: US 10,855,136 B2
(45) Date of Patent: Dec. 1, 2020

(54) COOLING UNIT OF DRIVE MOTOR

(71) Applicants: Hyundai Motor Company, Seoul (KR); Kia Motors Corporation, Seoul (KR)

(72) Inventors: Kyoungbum Kim, Gyeonggi-do (KR); MyungKyu Jeong, Seoul (KR); GaEun Lee, Gyeonggi-do (KR); SangHwa Do, Gyeonggi-do (KR); Young Jin Seo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 106 days.

(21) Appl. No.: 16/352,071

(22) Filed: Mar. 13, 2019

(65) Prior Publication Data

US 2019/0214879 A1    Jul. 11, 2019

Related U.S. Application Data

(62) Division of application No. 15/264,767, filed on Sep. 14, 2016, now Pat. No. 10,333,368.

(30) Foreign Application Priority Data

Apr. 18, 2016    (KR) .................. 10-2016-0047095

(51) Int. Cl.
| | |
|---|---|
| *H02K 5/20* | (2006.01) |
| *H02K 1/32* | (2006.01) |
| *H02K 9/16* | (2006.01) |
| *H02K 1/20* | (2006.01) |
| *H02K 9/19* | (2006.01) |

(52) U.S. Cl.
CPC .................. *H02K 5/20* (2013.01); *H02K 1/20* (2013.01); *H02K 1/32* (2013.01); *H02K 1/325* (2013.01); *H02K 9/16* (2013.01); *H02K 9/19* (2013.01)

(58) Field of Classification Search
CPC ........... H02K 1/20; H02K 1/32; H02K 1/325; H02K 5/20; H02K 9/00–9/20
See application file for complete search history.

(56) References Cited

U.S. PATENT DOCUMENTS

| 6,727,611 B2 | 4/2004 | Bostwick |
| 2013/0049495 A1 | 2/2013 | Matsuo |

FOREIGN PATENT DOCUMENTS

| CN | 102165673 A | 8/2011 |
| CN | 102651579 A | 8/2012 |
| CN | 104167872 A | 11/2014 |
| CN | 105264752 A | 1/2016 |

(Continued)

*Primary Examiner* — Ramon M Barrera
(74) *Attorney, Agent, or Firm* — Mintz Levin Cohn Ferris Glovsky and Popeo, P.C.; Peter F. Corless

(57) ABSTRACT

A cooling unit of a drive motor includes: a fixing member installed on an inner wall surface of a motor housing and configured to fix a stator core of the drive motor, wherein the fixing member has a ring shape, includes a flow path formed therein in order to allow a cooling medium to flow, and includes a cooling medium inlet and a cooling medium outlet formed to be connected to the flow path, the flow path includes a first path connecting the cooling medium inlet and the cooling medium outlet to each other at one side and a second path connecting the cooling medium inlet and the cooling medium outlet to each other at another side, and the first and second paths have different flow cross sections and are connected to each other.

5 Claims, 5 Drawing Sheets

(56) References Cited

FOREIGN PATENT DOCUMENTS

| | | |
|---|---|---|
| JP | 2006-174550 A | 6/2006 |
| JP | 3815399 B2 | 8/2006 |
| JP | 2010-273424 A | 12/2010 |
| JP | 2014-107888 A | 6/2014 |
| JP | 2014-222984 A | 11/2014 |
| WO | 2012/118008 A1 | 9/2012 |

COOLING UNIT OF DRIVE MOTOR

CROSS-REFERENCE TO RELATED APPLICATION

This application is a divisional of U.S. patent application Ser. No. 15/264,767 filed on Sep. 14, 2016 which claims under 35 U.S.C. § 119(a) the benefit of Korean Patent Application No. 10-2016-0047095 filed in the Korean Intellectual Property Office on Apr. 18, 2016, the entire contents of which are incorporated herein by reference.

BACKGROUND

(a) Technical Field

The present invention relates to a drive motor for a vehicle, more particularly, to a cooling unit of the drive motor capable of cooling a stator core of the drive motor fixed within a housing.

(b) Description of the Related Art

Generally, an electric vehicle or a hybrid vehicle called an environmentally-friendly vehicle may be driven by an electric motor (hereinafter, referred to as a "drive motor") obtaining a torque by power of a battery.

The drive motor as described above includes a stator core. The stator core is fixed within a housing, and a rotor is mounted integrally with a motor shaft of the drive motor.

Meanwhile, a large amount of heat is generated due to an eddy current generated in the stator core of the drive motor, cooling should be necessarily performed in order to prevent damage due to the heat and secure continuously stable operability.

Particularly, cooling of the drive motor such as a permanent magnet synchronous motor (PMSM) plays a very important role in efficiency of the motor and protection of core components (a permanent magnet, a winding coil, and the like). In the drive motor, when a temperature of the permanent magnet becomes a predetermined level or more, permanent magnet demagnetization is generated, such that intensity of magnetic force becomes weak, which has a significantly negative influence on efficiency of the motor.

For cooling the drive motor, an oil cooling scheme through oil and a water cooling scheme through a coolant have been mainly used. Among them, a cooling unit of the drive motor depending on the water cooling scheme will be described by way of example. In the cooling unit of the drive motor depending on the water cooling scheme, a support ring for cooling a stator core simultaneously with fixing the stator core to a housing is installed between the housing and the stator core.

In the related art, the support ring includes a coolant flow path formed therein along a ring direction (a circumferential direction) in order to allow a coolant to flow. In addition, the support ring includes a coolant inlet formed in order to inject the coolant into the cooling flow path, and a coolant outlet formed in order to exhaust the coolant from the coolant flow path. Here, the coolant injected through the coolant inlet may flow from the coolant inlet to both sides along the coolant flow path, and be exhausted through the coolant outlet.

Therefore, the coolant flow path of the support ring may include a first path connecting the coolant inlet and the coolant outlet to each other at one side and a second path connecting the coolant inlet and the coolant outlet to each other at another side. Here, the coolant flow path may include the first and second paths of which flow cross-sectional areas are the same as each other and lengths are different from each other.

Therefore, in the coolant flow path of the support ring according to the related art, the flow cross-sectional areas of the first and second paths are the same as each other and the lengths of the first and second paths are different from each other, such that a greater amount of flow rate may be introduced into a path having a shorter length, among the first and second paths.

Therefore, in the related art, imbalance of a flow rate of the coolant flowing along the first and second paths occurs in the coolant flow path of the support ring, which may cause cooling imbalance of the drive motor.

The above information disclosed in this Background section is only for enhancement of understanding of the background of the invention and therefore it may contain information that does not form the prior art that is already known in this country to a person of ordinary skill in the art.

SUMMARY

The present invention provides a cooling unit of a drive motor having advantages of decreasing imbalance of a flow rate of a coolant flowing along a coolant flow path of a support ring.

An exemplary embodiment of the present invention provides a cooling unit of a drive motor, including: a fixing member installed on an inner wall surface of a motor housing and configured to fix a stator core of the drive motor, wherein the fixing member has a ring shape, includes a flow path formed therein in order to allow a cooling medium to flow, and includes a cooling medium inlet and a cooling medium outlet formed to be connected to the flow path, the flow path includes a first path connecting the cooling medium inlet and the cooling medium outlet to each other at one side and a second path connecting the cooling medium inlet and the cooling medium outlet to each other at another side, and the first and second paths have different flow cross sections and are connected to each other.

The first and second paths may have different lengths, and the first path may have a length longer than that of the second path.

The first path may have a flow cross section larger than that of the second path.

The first and second paths may allow the same flow rate of cooling medium to flow.

Another exemplary embodiment of the present invention provides a cooling unit of a drive motor including: a fixing member installed on an inner wall surface of a motor housing and configured to fix a stator core of the drive motor, wherein the fixing member has a ring shape, includes a flow path formed therein in order to allow a cooling medium to flow, and includes a cooling medium inlet and a cooling medium outlet formed to be connected to the flow path, the flow path includes a first path connecting the cooling medium inlet and the cooling medium outlet to each other at one side and a second path connecting the cooling medium inlet and the cooling medium outlet to each other at another side, and the first and second paths have different lengths, a plurality of through-holes connected to the flow path are formed along an outer circumferential direction of the fixing member in an outer circumferential surface of the fixing member, and cap plugs are installed in the through-holes, and the cap plugs are inserted into the through-holes at different depths so as to each correspond to the first and second paths.

The first and second paths may have the same flow cross section and be connected to each other.

The first path may have a length longer than that of the second path.

An insertion depth of the cap plugs corresponding to the first path may be shallower than that of the cap plugs corresponding to the second path.

Yet another exemplary embodiment of the present invention provides a cooling unit of a drive motor including: a fixing member installed on an inner wall surface of a motor housing and configured to fix a stator core of the drive motor, wherein the fixing member has a ring shape, includes a flow path formed therein in order to allow a cooling medium to flow, and includes a cooling medium inlet and a cooling medium outlet formed to be connected to the flow path, the flow path includes a first path connecting the cooling medium inlet and the cooling medium outlet to each other at one side and a second path connecting the cooling medium inlet and the cooling medium outlet to each other at another side, and the first and second paths have different lengths, a plurality of through-holes connected to the flow path are formed along an outer circumferential direction of the fixing member in an outer circumferential surface of the fixing member, and cap plugs are installed in the through-holes, and the cap plugs are inserted into the through-holes at different depths so as to each correspond to the first and second paths, and insertion depths of the cap plugs are varied by actuators.

The first and second paths may have the same flow cross section and be connected to each other.

The first path may have a length longer than that of the second path.

An insertion depth of the cap plugs corresponding to the second path may be deeper than that of the cap plugs corresponding to the first path.

The actuators may include operation cylinders connected to the cap plugs corresponding to the second path.

BRIEF DESCRIPTION OF THE DRAWINGS

A brief description of the drawings will be provided to more sufficiently understand the drawings which are used in the detailed description of the present invention.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
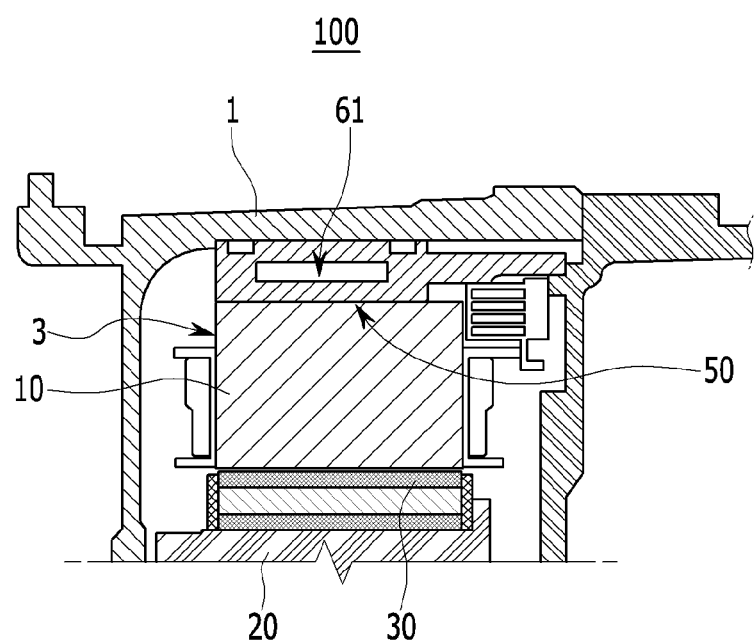
FIG. 1 is a cross-sectional view schematically showing a cooling unit of a drive motor according to an exemplary embodiment of the present invention.

FIG. 1 is a cross-sectional view schematically showing a cooling unit of a drive motor according to an exemplary embodiment of the present invention.

Referring to FIG. 1, an exemplary embodiment of the present invention may be used in a drive motor 3 used in an electric vehicle or a hybrid vehicle. The drive motor 3 may include a permanent magnet synchronous motor (PMSM) or a wound rotor synchronous motor (WRSM).

The drive motor 3 includes a stator core 10 fixed within a motor housing 1 (hereinafter, referred to as a "housing" for convenience) and generating a magnetic flux, and a rotor core 30 disposed to have a predetermined gap from the stator core 10 and be rotated around a rotation shaft 20, which is a drive shaft. For example, the drive motor 3 may be used in an inner rotor type synchronous motor in which the rotor core 30 is disposed inside the stator core 10.

A cooling unit 100 of the drive motor 3 according to an exemplary embodiment of the present invention as described above has a structure in which the stator core 10 of the drive motor 3 is fixed within the housing 1, and the stator core 10 may be cooled by a cooling medium (for example, a coolant).

In an exemplary embodiment of the present invention, the cooling unit 100 of the drive motor 3 that may decrease imbalance of a flow rate of the cooling medium and further improve cooling performance for the stator core 10 of the drive motor 3 is provided.

To this end, the cooling unit 100 of the drive motor 3 according to an exemplary embodiment of the present invention includes a fixing member 50 installed between the housing 1 and the stator core 10.

Figure 2:
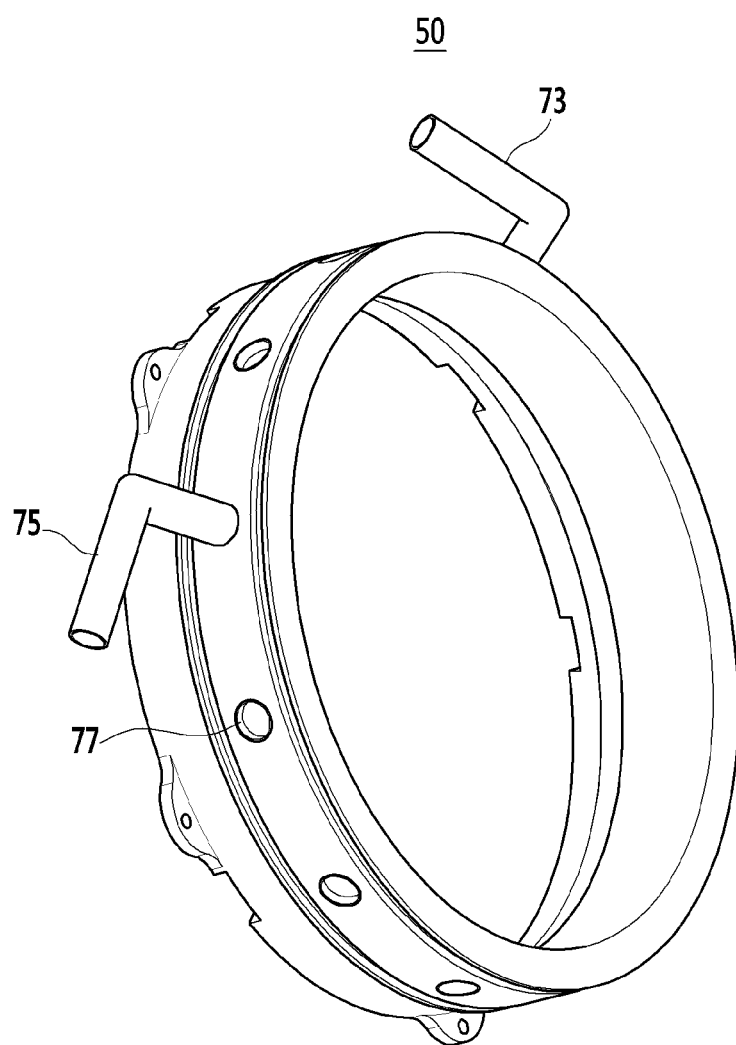
FIG. 2 is a perspective view showing a fixing member used in the cooling unit of the drive motor according to an exemplary embodiment of the present invention.
Figure 3:
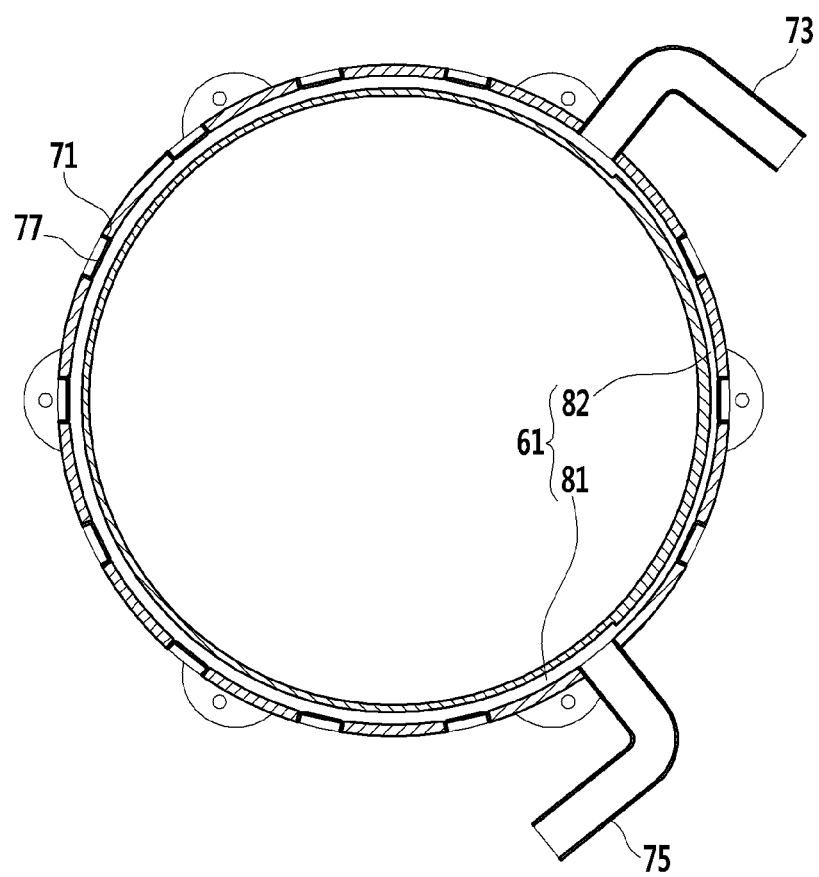
FIG. 3 is a cross-sectional view showing the fixing member used in the cooling unit of the drive motor according to an exemplary embodiment of the present invention.

FIG. 2 is a perspective view showing a fixing member used in the cooling unit of the drive motor according to an exemplary embodiment of the present invention, and FIG. 3 is a cross-sectional view of FIG. 2.

Referring to FIGS. 1 to 3, in an exemplary embodiment of the present invention, the purpose of the fixing member 50 is to cool heat generated in the stator core 10 through a coolant, which is a cooling medium, in a water cooling scheme, simultaneously with supporting and fixing the stator core 10 of the drive motor 3 within the housing 1.

The fixing member 50 is provided as a support ring of which an entire shape is a ring shape, and is installed between the housing 1 and the stator core 10. The fixing member 50 may be formed of a stainless steel material having a thermal expansion coefficient similar to that of the stator core 10.

In an exemplary embodiment of the present invention, the fixing member 50 includes a coolant flow path 61 allowing the coolant, which is the cooling medium, to flow in a ring direction (a circumferential direction) in order to cool the stator core 10. The coolant flow path 61 may be formed integrally with the fixing member 50 within the fixing member 50.

The fixing member 50 preferably is manufactured through core type low pressure casting, and the coolant flow path 61 is formed integrally with the fixing member 50 within the fixing member 50. That is, the coolant flow path 61 may be formed as an annular internal space within a ring-shaped body of the fixing member 50 by molding the ring-shaped body of the fixing member 50 through the low pressure casting.

In addition, a plurality of through-holes 71 connected to the coolant flow path 61 are formed along an outer circumferential direction of the fixing member 50 in an outer circumferential surface of the fixing member 50. The through-holes 71 are formed along a circumferential direction in the outer circumferential surface of the fixing member 50 so as to be spaced apart from each other by predetermined intervals.

The through-holes 71 may be formed as core holes for forming the coolant flow path 61 within the fixing member 50. A cooling medium inlet 73 for injecting the coolant into the coolant flow path 61 is formed in any one of the through-holes 71. In addition, a cooling medium outlet 75 for exhausting the coolant from the coolant flow path 61 is formed in another of the through-holes 71.

Cap plugs 77 (shown by an alternate long and short dash line in FIG. 3) for plugging the through-holes 71 are installed in through-holes other than the through-holes in which the cooling medium inlet 73 and the cooling medium outlet 75 are installed among the through-holes 71. The cap plugs 77 plug the through-holes 71 while being inserted into the through-holes 71 in a press-fitting scheme.

Meanwhile, in an exemplary embodiment of the present invention, since the coolant flow path 61 to which the coolant flows is formed along the circumferential direction (or the ring direction) of the fixing member 50, the coolant flow path 61 includes a first path 81 and a second path 82 connected to each other. The first and second paths 81 and 82 are divided along the circumferential direction of the fixing member 50 and are connected to each other, thereby making it possible to form the coolant flow path 61 described above.

The first path 81 connects the cooling medium inlet 73 and the cooling medium outlet 75 to each other at one side on the basis of the circumferential direction of the fixing member 50, and the second path 82 connects the cooling medium inlet 73 and the cooling medium outlet 75 to each other at another side on the basis of the circumferential direction of the fixing member 50.

The first and second paths 81 and 82 of the coolant flow path 61 are provided with different lengths. For example, a length of the first path 81 may be relatively longer than that of the second path 82.

In an exemplary embodiment of the present invention, the first and second paths 81 and 82 have different flow cross sections and are connected to each other. For example, a flow cross section of the first path 81 is larger than that of the second path 82.

Therefore, in the cooling unit 100 of a drive motor according to an exemplary embodiment of the present invention configured as described above, the fixing member 50 is installed between the housing 1 and the stator core 10, and the coolant flow path 61 to which the coolant flows is formed in the fixing member 50, thereby making it possible to allow the coolant to flow to the coolant flow path 61 and cool heat generated in the stator core 10 by the coolant.

In an exemplary embodiment of the present invention, the coolant injected through the cooling medium inlet 73 of the fixing member 50 may flow in two directions along the first and second paths 81 and 82 of the coolant flow path 61, and be exhausted through the cooling medium outlet 75.

Further, in an exemplary embodiment of the present invention, since the length of the first path 81 is longer than that of the second path 82 and the flow cross section of the first path 81 is larger than that of the second path 82, the first and second paths 81 and 82 may allow the same flow rate of cooling medium to flow.

That is, since the second path 82 having a length relatively shorter than that of the first path 81 has a flow cross section smaller than that of the first path 81, a flow velocity of the coolant is increased in the second path 82 as compared with in the first path 81. In addition, since the first path 81 having a length relatively longer than that of the second path 82 has a flow cross section larger than that of the second path 82, a flow velocity of the coolant is decreased in the first path 81 as compared with in the second path 82.

Therefore, imbalance of the flow rate of the coolant flowing along the first and second paths 81 and 82 of the coolant flow path 61 is decreased in an exemplary embodiment of the present invention as compared with the related art in which flow cross sections of the first and second paths are the same as each other and lengths of the first and second paths are different from each other. As a result, cooling performance for the stator core 10 of the drive motor 3 may be improved.

Figure 4:
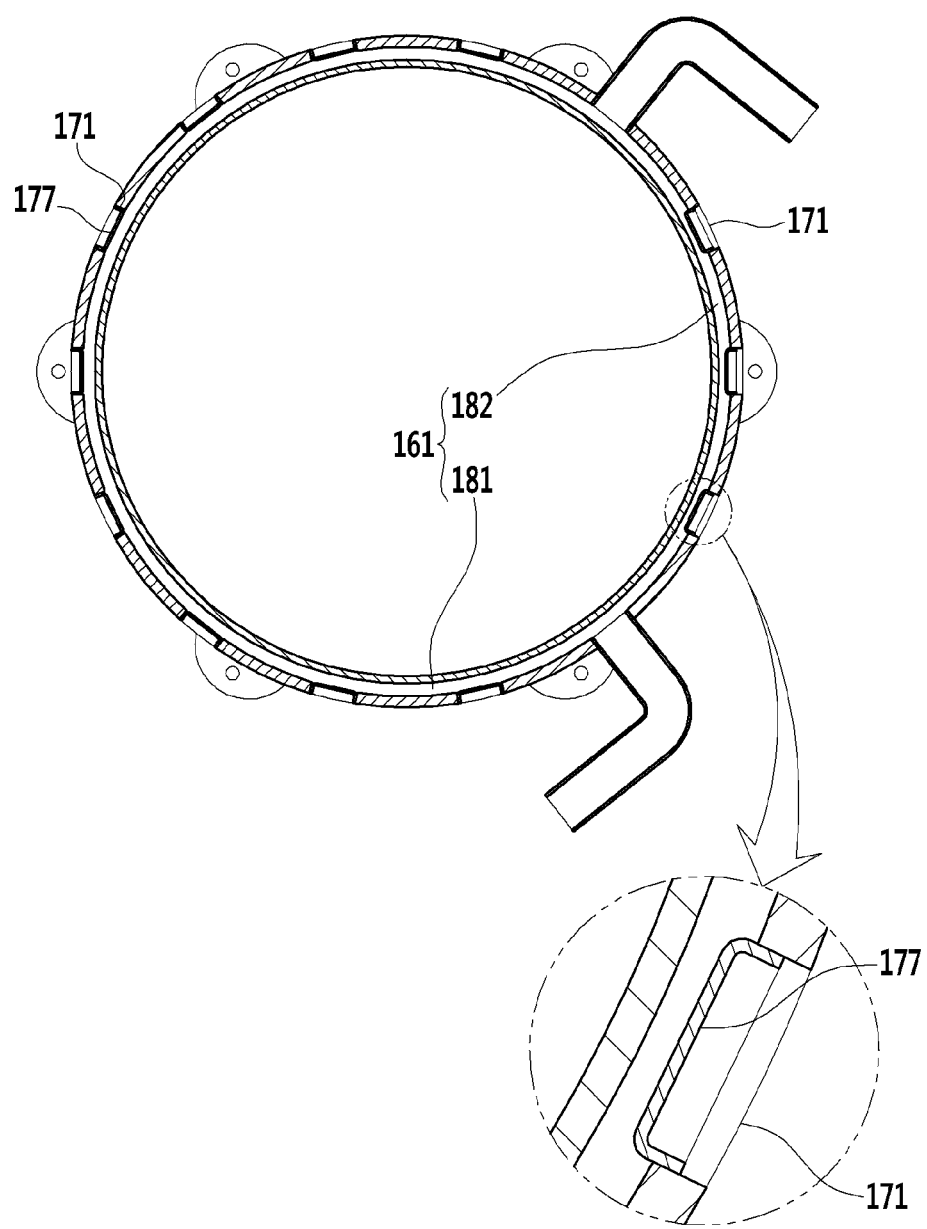
FIG. 4 is a cross-sectional view showing a fixing member used in a cooling unit of a drive motor according to another exemplary embodiment of the present invention.

FIG. 4 is a cross-sectional view showing a fixing member used in a cooling unit of a drive motor according to another exemplary embodiment of the present invention.

Referring to FIG. 4, the cooling unit of a drive motor according to another exemplary embodiment of the present invention may include a fixing member 150 having a coolant flow path 161 of which flow cross sections of first and second paths 181 and 182 are the same as each other and a length of the first path 181 is relatively longer than that of the second path 182.

Further, the cooling unit of a drive motor according to another exemplary embodiment of the present invention may include cap plugs 177 installed into through-holes 171 of the fixing member 150 at different insertion lengths so as to each correspond to the first and second paths 181 and 182.

Here, the cap plugs 177 in the first path 181 are inserted into the through-holes 171 at an insertion depth shallower than that of the cap plugs 177 in the second path 182. In addition, the cap plugs 177 in the second path 182 are inserted into the through-holes 171 at an insertion depth deeper than that of the cap plugs 177 in the first path 181.

Therefore, in another exemplary embodiment of the present invention, since the cap plugs 177 in the second path 182 having a length relatively shorter than that of the first path 181 are inserted into the through-holes 171 at an insertion depth deeper than that of the cap plugs 177 in the first path 181, a flow velocity of the coolant is increased in the second path 182 as compared with the first path 181.

In addition, in another exemplary embodiment of the present invention, since the cap plugs 177 in the first path 181 having a length relatively longer than that of the second path 182 are inserted into the through-holes 171 at an insertion depth shallower than that of the cap plugs 177 in the second path 182, a flow velocity of the coolant is decreased in the first path 181 as compared with the second path 182.

Therefore, in another exemplary embodiment of the present invention, insertion depths of the cap plugs 177 each corresponding to the first and second paths 181 and 182 of the coolant flow path 161 are set to be different from each other, thereby decreasing imbalance of a flow rate of the coolant flowing along the first and second paths 181 and 182. Therefore, cooling performance for the stator core of the drive motor may be increased.

Figure 5:
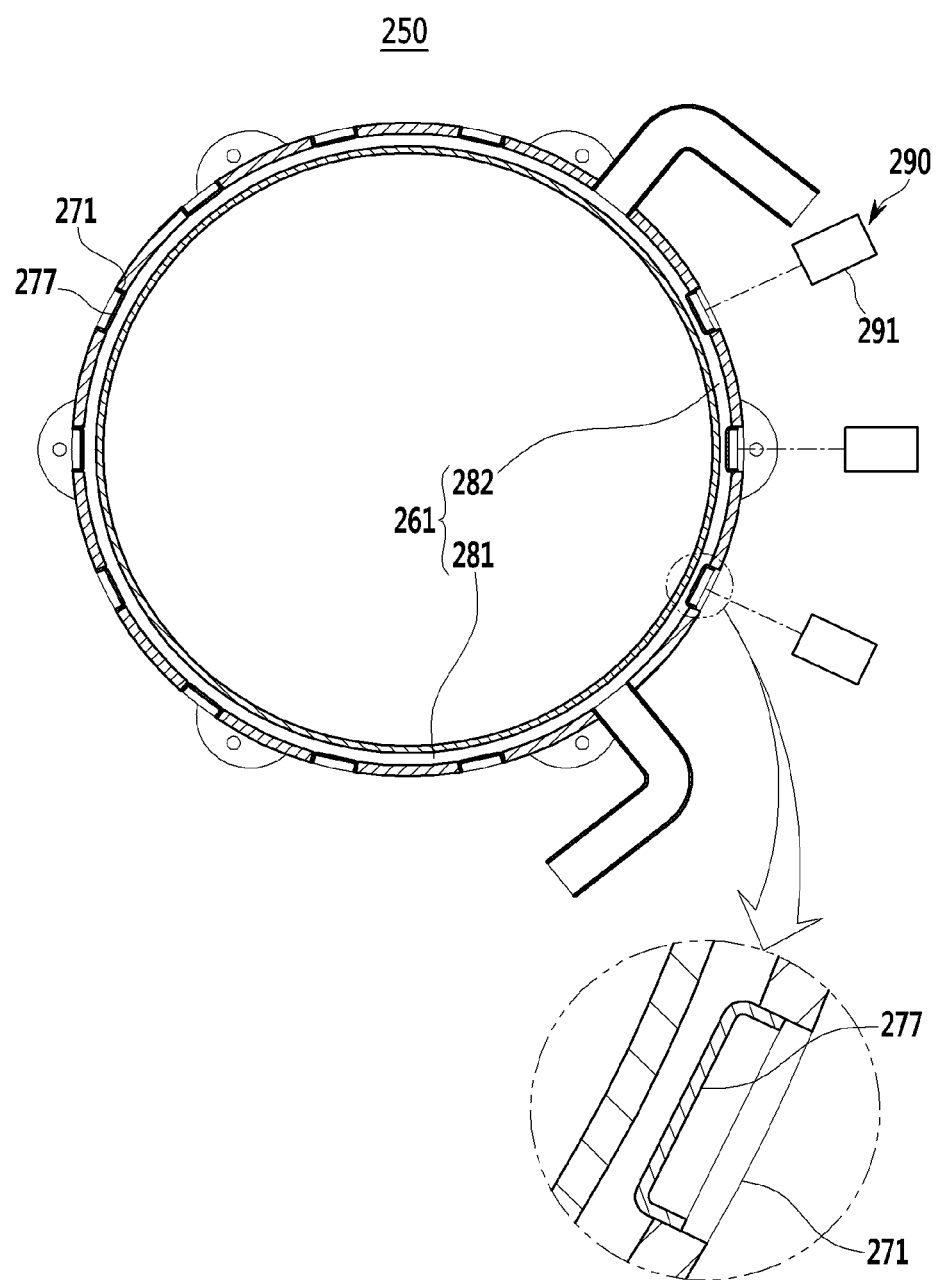
FIG. 5 is a cross-sectional view showing a fixing member used in a cooling unit of a drive motor according to yet another exemplary embodiment of the present invention.

FIG. 5 is a cross-sectional view showing a fixing member used in a cooling unit of a drive motor according to yet another exemplary embodiment of the present invention.

Referring to FIG. 5, the cooling unit of a drive motor according to yet another exemplary embodiment of the present invention may include a fixing member 250 having a coolant flow path 261 of which flow cross sections of first and second paths 281 and 282 are the same as each other and a length of the first path 281 is relatively longer than that of the second path 282, similar to the cooling unit of a drive motor according to another exemplary embodiment of the present invention described above.

Further, the cooling unit of a drive motor according to yet another exemplary embodiment of the present invention may include cap plugs 277 installed into through-holes 271 of the fixing member 250 at different insertion lengths so as to each correspond to the first and second paths 281 and 282.

In yet another exemplary embodiment of the present invention, insertion depths of the cap plugs 277 each corresponding to the first and second paths 281 and 282 may be varied by actuators 290.

For example, the cap plugs 277 in the second path 282 are inserted into the through-holes 271 at an insertion depth deeper than that of the cap plugs 277 in the first path 281 by the actuators 290.

Here, the cap plugs 277 in the first path 281 are inserted into the through-hole 271 at an insertion depth shallower than that of the cap plugs 277 in the second path 282, for example, by a thickness of the through-holes 271.

The actuators 290 as described above may include, for example, operation cylinders 291 installed to be connected to the cap plugs 277 corresponding to the second path 282 and well-known in the related art.

Therefore, since the cap plugs 277 in the second path 282 having a length relatively shorter than that of the first path 281 are inserted into the through-holes 271 at an insertion depth deeper than that of the cap plugs 277 in the first path 281 by the actuators 290, a flow velocity of the coolant is increased in the second path 282 as compared with in the first path 281.

In addition, since the cap plugs 277 in the first path 281 having a length relatively longer than that of the second path 282 are inserted into the through-holes 271 at an insertion depth shallower than that of the cap plugs 277 in the second path 282, a flow velocity of the coolant is decreased in the first path 281 as compared with the second path 282.

Therefore, in yet another exemplary embodiment of the present invention, insertion depths of the cap plugs 277 each corresponding to the first and second paths 281 and 282 of the coolant flow path 261 are set to be different from each other through the actuators 290, thereby decreasing imbalance of a flow rate of the coolant flowing along the first and second paths 281 and 282 of the coolant flow part 261. Therefore, cooling performance for the stator core of the drive motor may be increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A cooling unit of a drive motor, comprising:
a fixing member installed on an inner wall surface of a motor housing and configured to fix a stator core of the drive motor,
wherein the fixing member has a ring shape, includes a flow path formed therein in order to allow a cooling medium to flow, and includes a cooling medium inlet and a cooling medium outlet formed to be connected to the flow path,
the flow path includes a first path connecting the cooling medium inlet and the cooling medium outlet to each other at one side and a second path connecting the cooling medium inlet and the cooling medium outlet to each other at another side, and the first and second paths have different lengths,
a plurality of through-holes connected to the flow path are formed along an outer circumferential direction of the fixing member in an outer circumferential surface of the fixing member, and cap plugs are installed in the through-holes, and
the cap plugs are inserted into the through-holes at different depths so as to each correspond to the first and second paths, and insertion depths of the cap plugs are varied by actuators.

2. The cooling unit of a drive motor of claim 1, wherein:
the first and second paths have the same flow cross section and are connected to each other.

3. The cooling unit of a drive motor of claim 2, wherein:
the first path has a length longer than that of the second path.

4. The cooling unit of a drive motor of claim 3, wherein:
an insertion depth of the cap plugs corresponding to the second path is deeper than that of the cap plugs corresponding to the first path.

5. The cooling unit of a drive motor of claim 4, wherein:
the actuators include operation cylinders connected to the cap plugs corresponding to the second path.

* * * * *